United States Patent [19]
Phelps

[11] Patent Number: 6,119,019
[45] Date of Patent: Sep. 12, 2000

[54] FLIP COVER ASSEMBLY INCORPORATING A CAM MEMBER

[75] Inventor: Craig Phelps, Raleigh, N.C.

[73] Assignee: Ericsson Inc., Research Triangle Park, N.C.

[21] Appl. No.: 08/813,610

[22] Filed: Mar. 10, 1997

[51] Int. Cl.$^7$ ....................................................... H04B 1/38
[52] U.S. Cl. ............................. 455/550; 455/90; 455/575
[58] Field of Search ..................................... 379/428, 433; 455/90, 403, 550, 575; D14/137, 138

[56] References Cited

U.S. PATENT DOCUMENTS

| | | |
|---|---|---|
| 4,658,547 | 4/1987 | Oboza . |
| 5,507,013 | 4/1996 | Weadon et al. ............................. 455/90 |
| 5,651,063 | 7/1997 | Ji et al. ..................................... 379/433 |
| 5,661,797 | 8/1997 | Leman et al. ............................. 379/428 |
| 5,732,331 | 3/1998 | Harms ....................................... 379/433 |
| 5,832,079 | 11/1998 | Rabe ......................................... 379/433 |

FOREIGN PATENT DOCUMENTS 2301146  11/1996  United Kingdom .

*Primary Examiner*—William G. Trost
*Assistant Examiner*—Nay Maung
*Attorney, Agent, or Firm*—Nixon & Vanderhye P.C.

[57] ABSTRACT

A flip cover assembly for an apparatus having an apparatus housing includes a cam member rotatably attached to the apparatus housing, a flip cover attached to the cam member for rotating with the cam member, and structure formed in the apparatus housing for urging the cam member and thus the flip cover toward one of an open position and a closed position in accordance with a relative position of the cam member. The cam member includes at least two dwell surfaces disposed on opposite sides of a raised surface. The dwell surfaces engage the urging structure in the open and closed positions, respectively, and the raised surface of the cam member engages the urging structure in an opening/closing position between the open and closed positions. The arrangement provides a positive "feel" for the open and closed positions, and by using a cam mechanism, multiple variations on flip cover feel and motion can be achieved. Moreover, the simplified structure reduces manufacturing time and costs.

13 Claims, 3 Drawing Sheets

6,119,019

FLIP COVER ASSEMBLY INCORPORATING A CAM MEMBER

BACKGROUND OF THE INVENTION

The present invention relates to a flip cover assembly for a cellular phone or the like and, in particular, to a flip cover assembly utilizing a cam member to provide a positive open and closed position with a unique feel and lasting mechanical life.

In the design of cellular telephones and similar communications technology, it is desirable to have a mechanical flip cover that can be used to answer and terminate a call, protect the keypad and contain a microphone. When using a flip cover, it is desirable to have positive open and closed positions without significant play in the range of motion of the flip cover.

Many solutions have been provided for this problem in the past. One elaborate design includes a viscously-damped torsional spring with a latch that will keep the flip cover closed until it is released via a button. Still other designs rely on a simple mechanical interference like a small dimple in one of the mating halves, which has a mating bump specifically located for the open and closed positions. In the dimple design, the flip cover naturally wants to be in the mated position due to the deflection of the plastic when in the unmated position. A still simpler design includes a simple hinge (shaft in hole) that has a certain amount of interference between the shaft and the hole to prevent the assembly from moving too freely.

These conventional designs, however, suffer from various drawbacks. In particular, the torsional spring arrangement adds significant cost to the device. Although it provides the nicest feel and action, the added cost greatly hinders its success. The dimple design provides a desirable tactile feel and positive open and closed positions; however, due to the friction and force between the dimple and the bump, the material often deforms over time, and the assembly becomes less desirable. Finally, the simple hinge provides no positive open and closed positions and also becomes loose over time.

SUMMARY OF THE INVENTION

In accordance with the present invention, a flip cover assembly is provided that overcomes the drawbacks associated with the conventional arrangements. In particular, the present invention includes a flip cover assembly To having a cam feature that controls the motion of the flip cover as the cam rotates over a deflecting part in the apparatus housing.

In a preferred embodiment according to the invention, there is provided a flip cover assembly for a cellular phone having a phone housing. The flip cover assembly includes a cam member rotatably attached to the phone housing, a flip cover attached to the cam member for rotating with the cam member, and a deflecting beam formed in the phone housing and engaged with the cam member.

The cam member preferably includes at least a first dwell surface and a second dwell surface disposed on opposite sides of a raised surface. The cam member, together with the flip cover, is pivotable between a closed position in which the first dwell surface is engaged with the deflecting beam and an open position in which the second dwell surface is engaged with the deflecting beam. In this context, the deflecting beam may be displaceable between a relaxed position and a deflected position, wherein the deflecting beam is disposed in the relaxed position when the flip cover is in either the closed position or the open position. Still further, the cam member may be pivotable to an opening/closing position between the closed position and the open position in which the raised surface is engaged with the deflecting beam. In the opening/closing position, the deflecting beam is disposed in the deflected position.

The deflecting beam is preferably formed as a tab secured to the phone housing and disposed adjacent a well in the housing. In this context, the tab is displaceable between a relaxed position substantially level with the surface of the phone housing and a deflected position in which the tab is deflected into the well. The tab may be formed integral with the phone housing.

The flip cover assembly may further include a hinge wall formed in the phone housing that is disposed in the vicinity of the deflecting beam and extends substantially perpendicular to the phone housing surface. The hinge wall has a pivot pin receptacle therein, and the cam member includes a pivot pin engageable with the pivot pin receptacle.

In accordance with another aspect of the invention, there is provided a flip cover assembly for an apparatus having an apparatus housing. The flip cover assembly includes a cam member rotatably attached to the apparatus housing and including two dwell surfaces and a raised surface, a flip cover attached to the cam member for rotating with the cam member, the flip cover being pivotable between an open position and a closed position, and urging structure formed in the apparatus housing for urging the cam member and thus the flip cover toward one of the open position and the closed position in accordance with a relative position of the cam member.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
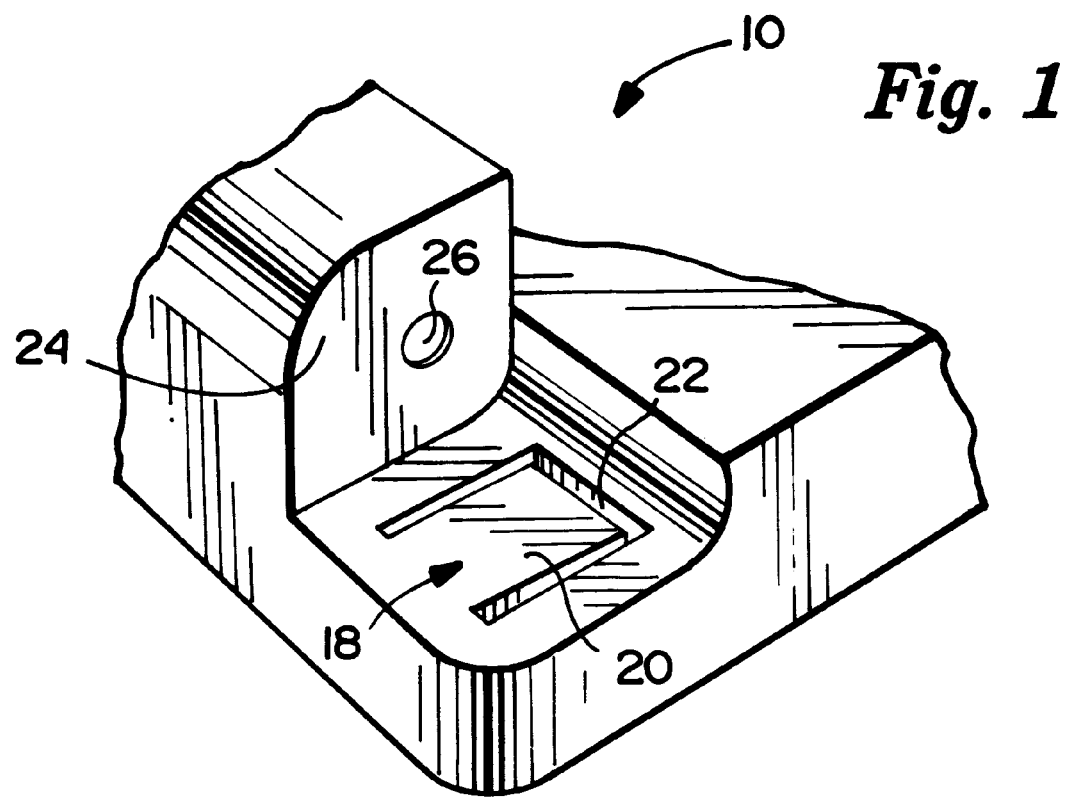
FIG. 1 is a perspective view of a housing incorporating the flip cover assembly of the present invention.

In the following detailed description, the flip cover assembly according to the present invention will be described in conjunction with its application to a cellular phone. This application, however, is for exemplary purposes only, and the subject matter according to the invention is not meant to be limited to the described application. To the contrary, the invention is suitable for any apparatus utilizing a flip cover assembly.

Referring to the FIGURES, the flip cover assembly 10 according to the present invention is secured to a housing 12 of a cellular phone or like apparatus. The flip cover assembly includes a cam member 14 rotatably attached to the phone housing 12. A flip cover 16 is preferably molded with the cam member 14 for rotation with the cam member 14. A deflecting beam 18 is formed in the housing 12 and is engaged with the cam member 14.

The cam member 14 is configured such that it includes at least a first dwell surface 14a and a second dwell surface 14b disposed on opposite sides of a raised surface 14c. As would be apparent to those of ordinary skill in the art, an infinite number of cam designs may be suitable, depending on the manufacturer's desired "feel" for the user. In operation, the cam member 14 functions such that it tends to remain in a position where the first dwell surface 14a or the second dwell surface 14b is contacting the deflecting beam 18.

As shown in FIG. 1, the deflecting beam 18 is defined by a tab 20 preferably formed integral with the housing 12 and disposed adjacent a well 22 in the housing. The purpose of the tab 20 is to provide the necessary force to keep the cam in the dwell position after opening or closing the flip cover. The deflecting beam 18/tab 20 is displaceable between a relaxed position substantially level with a surface of the phone housing as shown in FIGS. 2 and 4 and a deflected position in which the tab 20 is deflected into the well 22 as shown in FIG. 3.

In an alternative arrangement, the tab 20 can be joined to the assembly after molding or insert molded to the assembly. The post molding or insert molding option is attractive because different materials can be utilized to provide different friction and deflective forces between the cam 14 and the tab 20. One example of a suitable material for the tab 20 is beryllium-copper, which can be stamped and heat staked to the housing.

Figure 5:
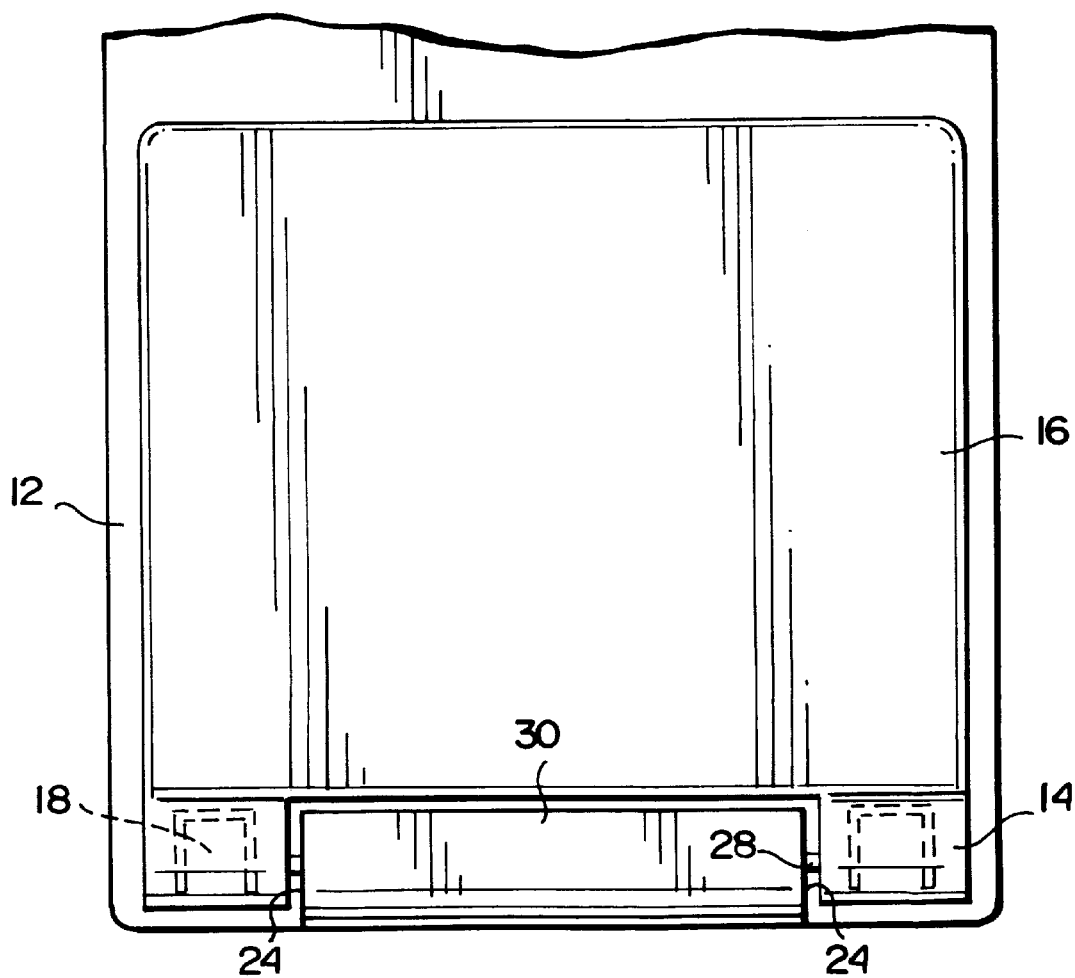
FIG. 5 is a plan view of the flip cover assembly.

A hinge wall 24 is formed in the housing 12 and disposed adjacent the deflecting beam 18 and extends substantially perpendicular to the phone housing surface. The hinge wall 24 includes a pivot pin receptacle 26 therein, which is shaped to receive a cam member pivot pin 28. Referring to FIG. 5, the flip cover 16 is molded with a pair of cam members 14, which are disposed surrounding a ridge 30 of the housing, the ridge 30 defining a pair of the hinge walls 24. The pivot pins 28 secure the flip cover to the housing 12.

Figure 2:
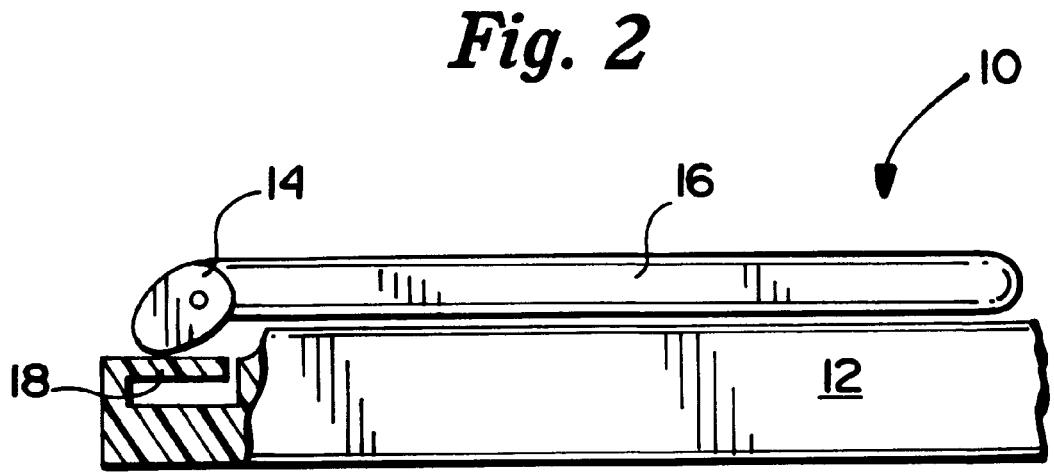
FIG. 2 is a side view of the flip cover assembly according to the present invention with the flip cover in the closed position.
Figure 3:
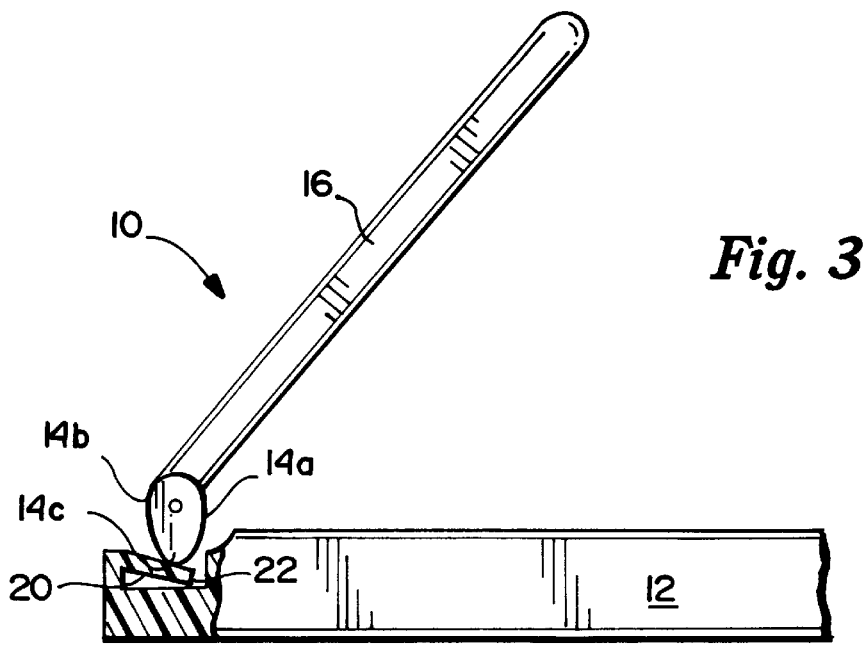
FIG. 3 is a side view of the flip cover assembly with the flip cover in the opening/closing position.
Figure 4:
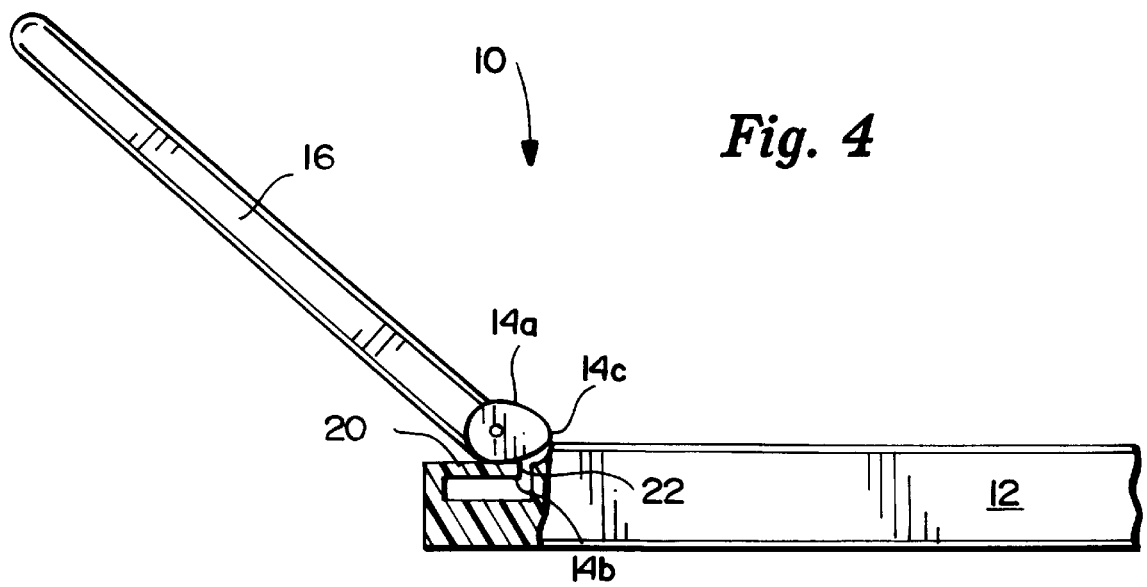
FIG. 4 is a side view of the flip cover assembly with the flip cover in the open position.

In operation, the flip cover 16 is rotatable with the cam member 14 between a closed position as shown in FIG. 2, an opening/closing position as shown in FIG. 3, and an open position as shown in FIG. 4. In the closed position, the first dwell surface 14a is engaged with the deflecting beam 18. Consequently, the deflecting beam 18 and first dwell surface 14a maintain the flip cover 16 in the closed position. As a user opens the flip cover 16 toward the open position, the flip cover 16 is pivoted to its opening/closing position between the closed position and the open position. In the opening/closing position, the raised surface 14c of the cam engages the deflecting beam 18 and displaces the deflecting beam 18 to a deflected position in the well 22. As the raised surface 14c is pivoted across the deflecting beam 18, the cam member 14 is urged (counter-clockwise in the FIGURES) toward engagement between the second dwell surface 14b and the deflecting beam 18. In the open position as shown in FIG. 4, the deflecting beam 18 returns to a relaxed position substantially level with a surface of the phone housing. In this position, the deflecting beam 18 maintains the flip cover 16 in the open position.

By virtue of the structure according to the present invention, positive open and closed positions are defined using a cam arrangement together with a deflecting beam that provides a force to maintain a specific flip cover position.

Unlike the dimple method, where the dimple will wear with time, the cam will function with much less resistance and consequently should provide little or no wear over time. Unlike the simple hinge mechanism, the assembly according to the invention will provide a smooth motion with positive open and closed positions. The simplified structure facilitates manufacturing and reduces costs. Still further, by using a cam with specifically designed dwell surfaces and raised surfaces, an entire new spectrum of capabilities for flip cover feel and motion can be achieved.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A flip cover assembly for a cellular phone having a phone housing, the flip cover assembly comprising:

a cam member rotatably attached to the phone housing;

a flip cover attached to said cam member for rotating with said cam member; and a deflecting beam formed in the phone housing and engaged with said cam member, wherein said cam member is formed in a non-circular cam shape and comprises at least a first dwell surface and a second dwell surface disposed on opposite sides of a raised surface defining said non-circular cam shape, said cam member, together with said flip cover, being pivotable between a positive closed position in which said first dwell surface is engaged with said deflecting beam and a positive open position in which said second dwell surface is engaged with said deflecting beam by virtue of said non-circular cam shape, and wherein said deflecting beam comprises a tab formed integral with the phone housing and disposed adjacent a well in the housing, said tab being displaceable between a relaxed position substantially level with an exterior surface of the phone housing and a deflected position in which said tab is deflected into said well.

2. A flip cover assembly according to claim 1, wherein said deflecting beam is disposed in said relaxed position when said flip cover is in either said closed position or said open position.

3. A flip cover assembly according to claim 2, wherein said cam member is pivotable to an opening/closing position between said closed position and said open position in which said raised surface is engaged with said deflecting beam, and wherein in said opening/closing position, said deflecting beam is disposed in said deflected position.

4. A flip cover assembly according to claim 1, wherein said cam member is pivotable to an opening/closing position between said closed position and said open position in which said raised surface is engaged with said deflecting beam.

5. A flip cover assembly according to claim 4, wherein in said opening/closing position, said deflecting beam is displaced to said deflected position, thereby urging said cam member toward one of said first and second dwell surfaces.

6. A flip cover assembly according to claim 1, wherein said cam member is molded with said flip cover.

7. A flip cover assembly according to claim 1, further comprising a hinge wall formed in the phone housing, said hinge wall being disposed in the vicinity of said deflecting beam and extending substantially perpendicular to said phone housing surface, said hinge wall having pivot pin receptacle therein, wherein said cam member comprises a pivot pin engageable with said pivot pin receptacle.

8. A flip cover assembly for an electronic apparatus having an apparatus housing, the flip cover assembly comprising:

a cam member rotatably attached to the apparatus housing and comprising two dwell surfaces and a raised surface;

a flip cover attached to said cam member for rotating with said cam member, said flip cover being pivotable between an open position and a closed position; and urging means formed in the apparatus housing for urging said cam member and thus said flip cover toward one of said open position and said closed position in accordance with a relative position of said cam member, said urging means comprising a tab formed integral with the apparatus housing and disposed adjacent a well in the housing, said tab being displaceable between a relaxed position substantially level with an exterior surface of the apparatus housing and a deflected position in which said tab is deflected into said well.

9. A flip cover assembly according to claim 8, wherein one of said dwell surfaces is engaged with said tab when the flip cover is pivoted to said closed position, and wherein the other of said dwell surfaces is engaged with said tab when the flip cover is pivoted to said open position.

10. A flip cover assembly according to claim 8, wherein said tab is disposed in said relaxed position when said flip cover is in either said closed position or said open position.

11. A flip cover assembly according to claim 10, wherein said cam member is pivotable to an opening/closing position between said closed position and said open position in which said raised surface is engaged with said tab, and wherein in said opening/closing position, said tab is disposed in said deflected position.

12. A flip cover assembly according to claim 8, wherein said cam member is molded with said flip cover.

13. A flip cover assembly according to claim 8, further comprising a hinge wall formed in the apparatus housing, said hinge wall being disposed in the vicinity of said tab and extending substantially perpendicular to said housing surface, said hinge wall having pivot pin receptacle therein, wherein said cam member comprises a pivot pin engageable with said pivot pin receptacle.

* * * * *